April 8, 1924.
R. S. BROWN
CHUCK
Filed May 26, 1923
1,489,976
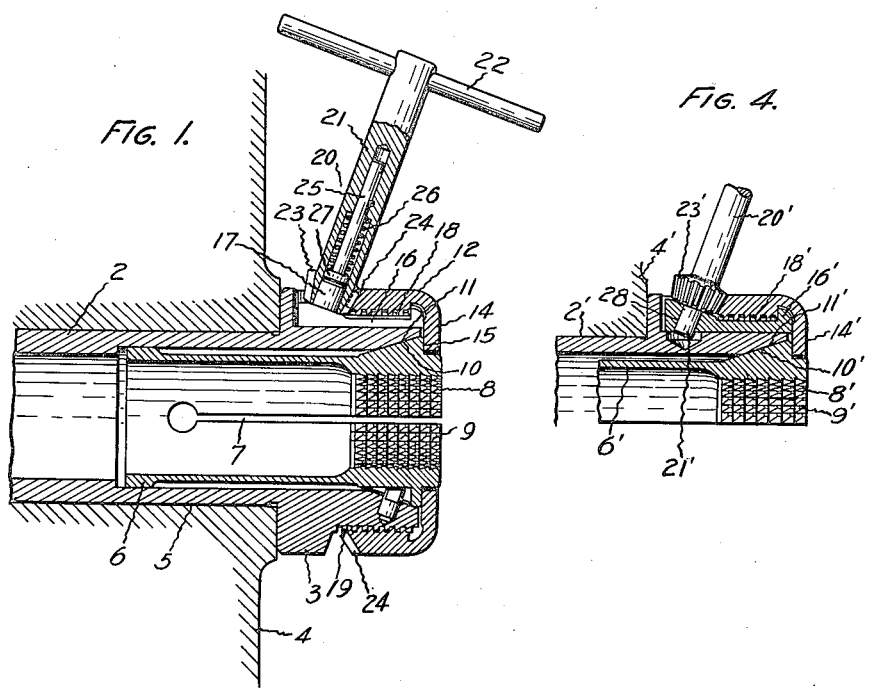
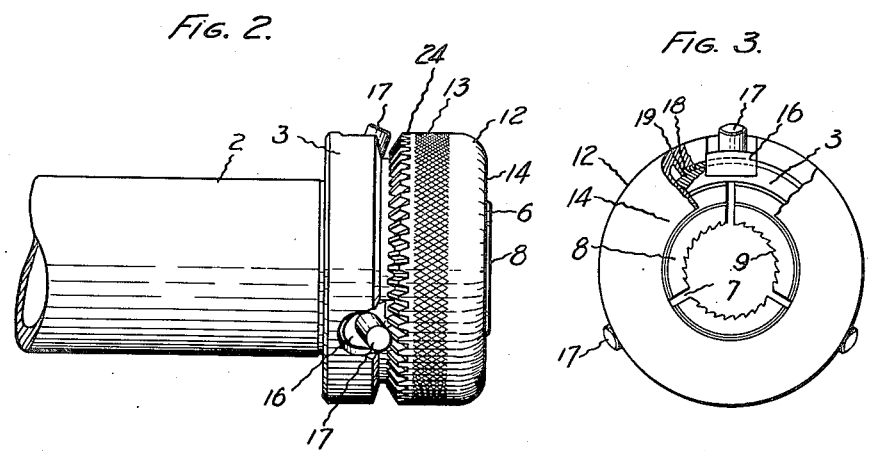
INVENTOR
R. S. Brown
ATTORNEY.

Patented Apr. 8, 1924.

1,489,976

UNITED STATES PATENT OFFICE.

ROBERT S. BROWN, OF NEW BRITAIN, CONNECTICUT, ASSIGNOR TO THE NEW BRITAIN MACHINE COMPANY, OF NEW BRITAIN, CONNECTICUT, A CORPORATION OF CONNECTICUT.

CHUCK.

Application filed May 26, 1923. Serial No. 641,681.

*To all whom it may concern:*

Be it known that I, ROBERT S. BROWN, citizen of the United States of America, residing at New Britain, in the county of Hartford and State of Connecticut, have invented certain new and useful Improvements in Chucks, of which the following is a specification.

This invention relates to chucks such as employed in metal working machines of various kinds and which can be utilized with equal advantage in wood working and other machines. The principal object of the invention is to provide a chuck which can be easily and readily set to obtain a firm grip on the work or tool whichever may be held thereby.

In the drawing accompanying and forming part of the present specification, I have shown in detail one of the many forms of embodiment of the invention which, to enable those skilled in the art to practice the same, will be set forth fully in the following description. Obviously, I am not restricted to the exact disclosure made by said drawing and description. I may depart therefrom in several ways within the scope of the invention defined by the claims following said description.

Referring to said drawing:

Fig. 1 is a vertical section elevation of a chuck involving the invention.

Fig. 2 is a plan view of the same.

Fig. 3 is a front elevation partly in section.

Fig. 4 is a detail in vertical section taken through a key or a modification.

Like characters refer to like parts throughout the several views.

Referring first to Figs. 1 and 3, the chuck shown comprises an elongated barrel, such as 2, having on its forward portion the circumferential flange 3 which is intended to abut against the support 4 in a bore 5 of which the chuck barrel or body 2 is fitted until the flange 3 impinges against the support or body 4.

Slidable longitudinally of the barrel 2 is a sleeve, as 6, which has in it several kerfs, as 7, to produce several resilient fingers 8, the acting or front portions of which present jaws. The front inner ends of the fingers 8 are serrated or roughened, as at 9, upon their inner surfaces to obtain a firm grip upon the object to be held.

Exteriorly, the sleeve 6 carrying the fingers 8, is provided with a cam surface 10, shown as being of taper or wedge form, and which co-acts with a similar surface, as 11, at the forward inner ends of the barrel 2. When, therefore, the sleeve 6 is advanced or moved toward the left in Fig. 1 the engagement between the cam surfaces 10 and 11 will cause the fingers 8 to grip the work or tool held by the fingers. On the movement of the sleeve 6 toward the right, the opposite action will ensue, to relieve the grip of the fingers upon the tool or work.

The barrel 2, as shown, is surrounded at the front end portion by the ring 12 which, as represented, is peripherally knurled as at 13 and which, as shown, has on its front side the inwardly disposed annular flange 14 which fits a rabbet, as 15, on the front end of the sleeve 6.

As shown, the barrel is provided with three longitudinally arranged guideways to guide three slides 16, each of which is furnished near its inner end with an inclined stud 17, to be engaged by an operating key, and near its outer end with an outwardly directed projection adapted to engage an internal groove in the ring 12. As represented, the body of the ring 12 has interior threads 18 to engage threads 19 on the exterior of the barrel 2. Obviously, rotation of the ring will cause its axial movement accompanied by a similar axial, but not rotary, movement of the slides.

To operate the ring 12 a key or wrench, such as 20, is shown. The shank 21 of the key has a handle 22 at its outward end to be engaged by a hand. It also terminates at its inner end in a pinion 23 shown as being of bevel type and which when the key or wrench 20 is properly associated with the stud 17, as shown in Fig. 1, is adapted to mesh with teeth, as bevel teeth 24, on the inner edge of the ring 12. The key pinion is kept in mesh with the gear upon the axially movable ring by the provision of the axially movable key supporting slides 16.

It will be assumed that it is desired to chuck an object. In this event the object is entered between the yieldable fingers 8 of the sleeve 6, following which the key, as 20, is fitted directly over one of the studs 17 until the teeth of the pinion 23 are in mesh with the bevel teeth 24 upon the ring 12. Upon the rotation, therefore, of the key 20 the ring 12 will be turned thus drawing it inwardly through its threaded connection with the barrel 2 and causing the annular flange 14 to impinge against the front end of the sleeve 6, to thrust said sleeve rearwardly and to cause the inclined or cam-surface 10 to ride along the inclined or cam-surface 11 and thus automatically cause the fingers 8 to grip the piece of stock of whatever nature it may be that may have been introduced into the fingers 8. Opposite rotation of the key 20 will bring about an opposite action so that the fingers will free the work which may be gripped.

In Fig. 1, the shank 21 of the key or wrench receives within it the slidable pin 25, the shank of which is surrounded by the spring 26, the rear end of which is in abutment against the rear end wall of said shank 21 while the front end of which engages the disk or head 27 at the lower or forward end of the pin 25. The disk or head 27 is in practice a mite back of the forward or inner end of the shank 21 so that when the shank is applied to a stud, as 17, the mere act of applying the wrench will cause this stud 17 to act against the head 27 and thus compress or condense the spring so that when the user releases the wrench from his grip the tensioned spring will be in condition to remove the wrench from the stud.

In Fig. 4 I have shown one of the many modifications of the structure, the principal difference in the case of the modified form is that there are no means for automatically effecting the removal of the wrench or key, as 20'. As the parts of the modified chuck are the same in construction, they will bear the characters heretofore used with the addition of prime marks. In the modified construction, the actuator 16' has near its rear portion a hole or perforation 28 which extends entirely through it and which receives a lower end of the shank 21'. With the exception noted, this is the only difference between the two structures. In the modified form the wrench or key 20' must be lifted off by hand but when so removed will leave no protrusion on the chuck to interfere with anything.

What I claim is:

1. A chuck comprising a barrel, a sleeve in the barrel having a plurality of yieldable fingers, cooperating cam faces on said fingers and barrel, a ring movable longitudinally of the barrel and having a portion cooperating with the barrel and a portion cooperating with the sleeve to move it longitudinally of the barrel; ring operating means gearing with said ring; longitudinally movable means cooperating with said ring and having means to support said ring operating means whereby rotation and the consequent axial movement of the ring to force the sleeve longitudinally into the barrel will cause a corresponding axial movement of said supporting means, thus keeping the ring and its operating means in operative engagement.

2. A chuck comprising a barrel, a sleeve in the barrel having a plurality of yieldable fingers, cooperating cam faces on said fingers and barrel, a ring movable longitudinally of the barrel and having a portion cooperating with the barrel and a portion cooperating with the sleeve to move it longitudinally of the barrel; ring operating means comprising a key having a socketed pinion head gearing with said ring; a spring pressed plunger in said key socket; grooves in said barrel; longitudinally movable means in said grooves cooperating with said ring and having studs adapted to be engaged by said key socket and to abut against said spring pressed plunger, whereby rotation and the consequent axial movement of the ring, to force the sleeve longitudinally into the barrel, will cause a corresponding axial movement of said longitudinally movable means and studs, thus keeping the ring and its operating pinion key in operative engagement.

In testimony whereof I affix my signature.

ROBERT S. BROWN.